United States Patent
Shintre et al.

(10) Patent No.: US 10,015,182 B1
(45) Date of Patent: Jul. 3, 2018

(54) SYSTEMS AND METHODS FOR PROTECTING COMPUTING RESOURCES

(71) Applicant: Symantec Corporation, Mountain View, CA (US)

(72) Inventors: Saurabh Shintre, Sunnyvale, CA (US); Aleatha Parker-Wood, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 214 days.

(21) Appl. No.: 15/199,336

(22) Filed: Jun. 30, 2016

(51) Int. Cl.
 *H04L 29/06* (2006.01)
(52) U.S. Cl.
 CPC .......... *H04L 63/1425* (2013.01); *H04L 63/10* (2013.01); *H04L 63/1441* (2013.01)
(58) Field of Classification Search
 CPC .. H04L 63/1425; H04L 63/1441; H04L 63/10
 See application file for complete search history.

(56) References Cited

U.S. PATENT DOCUMENTS

| 9,043,905 | B1* | 5/2015 | Allen | H04L 63/1441 726/22 |
| 9,772,896 | B2* | 9/2017 | Caffrey | H04L 41/142 |
| 2014/0047279 | A1* | 2/2014 | Sharma | G06F 11/079 714/39 |
| 2014/0165195 | A1* | 6/2014 | Brdiczka | G06F 21/552 726/23 |
| 2015/0081725 | A1* | 3/2015 | Ogawa | G06F 17/30595 707/754 |
| 2016/0070709 | A1* | 3/2016 | Luan | G06Q 30/0282 707/728 |
| 2016/0092774 | A1* | 3/2016 | Wang | G06N 5/04 706/12 |
| 2016/0154895 | A1* | 6/2016 | Koutra | G06N 5/048 706/46 |
| 2016/0274976 | A1* | 9/2016 | Manjunath | G06Q 10/00 |

(Continued)

OTHER PUBLICATIONS

Akoglu, Leman et al., "Graph-based Anomaly Detection and Description: A Survey", arXiv:1404.4679v2, Apr. 28, 2014, pp. 1-68. (Year: 2014).*

(Continued)

*Primary Examiner* — Michael Pyzocha
(74) *Attorney, Agent, or Firm* — FisherBroyles, LLP

(57) ABSTRACT

The disclosed computer-implemented method for protecting computing resources may include (i) computing a degree of commonality between pairs of users within a file sharing system based on which files the users accessed over a period of time, (ii) building a social graph that indicates at least one edge between members of an instance of the pairs of users, (iii) computing an anomaly score for a user within the instance of the pairs of users, (iv) detecting that the anomaly score deviates, according to a statistical measurement, from historical anomaly scores computed for the same user, and (v) performing, in response to detecting that the anomaly score deviates from the historical anomaly scores, a protective action to protect computing resources from anomalous behavior by the user. Various other methods, systems, and computer-readable media are also disclosed.

20 Claims, 8 Drawing Sheets

(56) References Cited

U.S. PATENT DOCUMENTS

2017/0155672 A1* 6/2017 Muthukrishnan ... H04L 63/1425
2017/0357905 A1* 12/2017 Rossi ............... G06F 17/30958

OTHER PUBLICATIONS

Ji, Tengfei et al., "Incremental Local Evolutionary Outlier Detection for Dynamic Social Networks", Machine Learning and Knowledge Discovery in Databases, ECML PKDD 2013, pp. 1-15. (Year: 2013).*
Young et al.; Detecting Unknown Insider Threat Scenarios; 2014 IEEE Security and Privacy Workshops; 2014.
Natarajan et al.; Towards a Social Network Approach for Monitoring Insider Threats to Information Security; School of Information Studies, Syracuse University; 2004.
Akoglu et al.; Oddball: Spotting Anomalies in Weighted Graphs; 2010; Zaki M.J., Yu J.X., Ravindran B., Pudi V. (eds) Advances in Knowledge Discovery and Data Mining. PAKDD 2010. Lecture Notes in Computer Science, vol. 6119. Springer, Berlin, Heidelberg.
Brdiczka et al.; Proactive Insider Threat Detection through Graph Learning and Psychological Context; Security and Privacy Workshops (SPW), 2012 IEEE Symposium; May 24, 2012.

* cited by examiner

400

402

Computation for User A
403

Number of Neighbors (N): 2
Total Edge Weight (EW):
1.0+0.5+0.75 = 2.25

Ratio: EW/N = 1.125

SYSTEMS AND METHODS FOR PROTECTING COMPUTING RESOURCES

BACKGROUND

Malicious insider behavior within an enterprise corporation's computing network is becoming increasingly common. After such behavior has occurred, the corporation naturally seeks to detect and ameliorate the malicious insider behavior quickly. For example, the enterprise corporation may lose substantial revenue due to data loss caused by the malicious insider. In other words, an individual with formal access to the enterprise corporation's files may cause substantial harm to the corporation both financially and otherwise. These malicious insiders are typically disgruntled employees who either wish to harm the corporation or to provide data to a competitor that has made an offer to the insider.

Although malicious insider behavior presents a significant challenge for enterprise corporations, as outlined above, the challenge has been difficult to overcome fully. For example, conventional corporate access control policies typically do not prevent insider threats. Similarly, the policies may be difficult to implement in a manner that addresses every scenario involving malicious insider behavior. Furthermore, conventional access control policies may not be based on rigorous technological assessment. Accordingly, what is needed are improved systems and methods for protecting computing resources, as discussed further below.

SUMMARY

As will be described in greater detail below, the instant disclosure describes various systems and methods for protecting computing resources by, for example, building a social graph for users of a file sharing system, computing anomaly scores for users within the social graph, and then detecting deviations between currently computed anomaly scores and historical average anomaly scores for the same user. In one example, a computer-implemented method for protecting computing resources may include (i) computing a degree of commonality between pairs of users within a file sharing system based on which files the users accessed over a period of time, (ii) building a social graph that indicates at least one edge between members of an instance of the pairs of users based on the respective degree of commonality for the instance, (iii) computing an anomaly score for a user within the instance of the pairs of users based on a ratio between a number of neighbors of the user within the social graph and a combined edge weight between nodes within a set including the user and the neighbors of the user, (iv) detecting that the anomaly score deviates, according to a statistical measurement, from historical anomaly scores computed for the same user, and (v) performing, in response to detecting that the anomaly score deviates from the historical anomaly scores, a protective action to protect computing resources from anomalous behavior by the user.

In some examples, building the social graph may include determining whether the respective degree of commonality for the instance satisfies a threshold degree of commonality and inserting a corresponding edge into the social graph based on determining that the respective degree of commonality for the instance satisfies the threshold degree of commonality. In one embodiment, the set including the user and the neighbors of the user includes the user and every neighbor of the user.

In one embodiment, the combined edge weight between nodes within the set is computed by adding an edge weight for every edge between any two members of the set. In some examples, detecting that the anomaly score deviates, according to the statistical measurement, from historical anomaly scores computed for the same user may include computing a difference value between the anomaly score and a value based on an average of the historical anomaly scores and determining that the difference value satisfies a threshold designated as indicating significant statistical deviation.

In one embodiment, the protective action may include alerting an administrator to the detecting that the anomaly score deviates from the historical anomaly scores. In one embodiment, (i) the file sharing system is used by a corporate enterprise organization, (ii) the user is an employee of the corporate enterprise organization, and (iii) the protective action is directed to protect computing resources belonging to the corporate enterprise organization from anomalous behavior by the user.

In one embodiment, the file sharing system is provided by a third party vendor to the corporate enterprise organization on a subscription basis. In some examples, computing the anomaly score for the user is performed as part of a batch process that iterates through each of multiple users to scan for anomalous behavior. In one embodiment, the protective action scans raw data logs to identify specific files accessed by the user that correspond to the anomalous behavior.

In one embodiment, a system for implementing the above-described method may include (i) a computation module, stored in memory, that computes a degree of commonality between pairs of users within a file sharing system based on which files the users accessed over a period of time, (ii) a building module, stored in memory, that builds a social graph that indicates at least one edge between members of an instance of the pairs of users based on the respective degree of commonality for the instance, (iii) where the computation module further computes an anomaly score for a user within the instance of the pairs of users based on a ratio between a number of neighbors of the user within the social graph and a combined edge weight between nodes within a set including the user and the neighbors of the user, (iv) a detection module, stored in memory, that detects that the anomaly score deviates, according to a statistical measurement, from historical anomaly scores computed for the same user, (v) a performance module, stored in memory, that performs, in response to detecting that the anomaly score deviates from the historical anomaly scores, a protective action to protect computing resources from anomalous behavior by the user, and (vi) at least one physical processor configured to execute the computation module, the building module, the detection module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) compute a degree of commonality between pairs of users within a file sharing system based on which files the users accessed over a period of time, (ii) build a social graph that indicates at least one edge between members of an instance of the pairs of users based on the respective degree of commonality for the instance, (iii) compute an anomaly score for a user within the instance of the pairs of users based on a ratio between a number of neighbors of the user within the social graph and a combined edge weight between nodes within a set including the user and the neighbors of the user, (iv) detect that the anomaly score deviates, according to a statistical measurement, from historical anomaly scores computed for the same user, and (v) perform, in response to detecting that the anomaly score deviates from the historical anomaly scores, a protective action to protect computing resources from anomalous behavior by the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
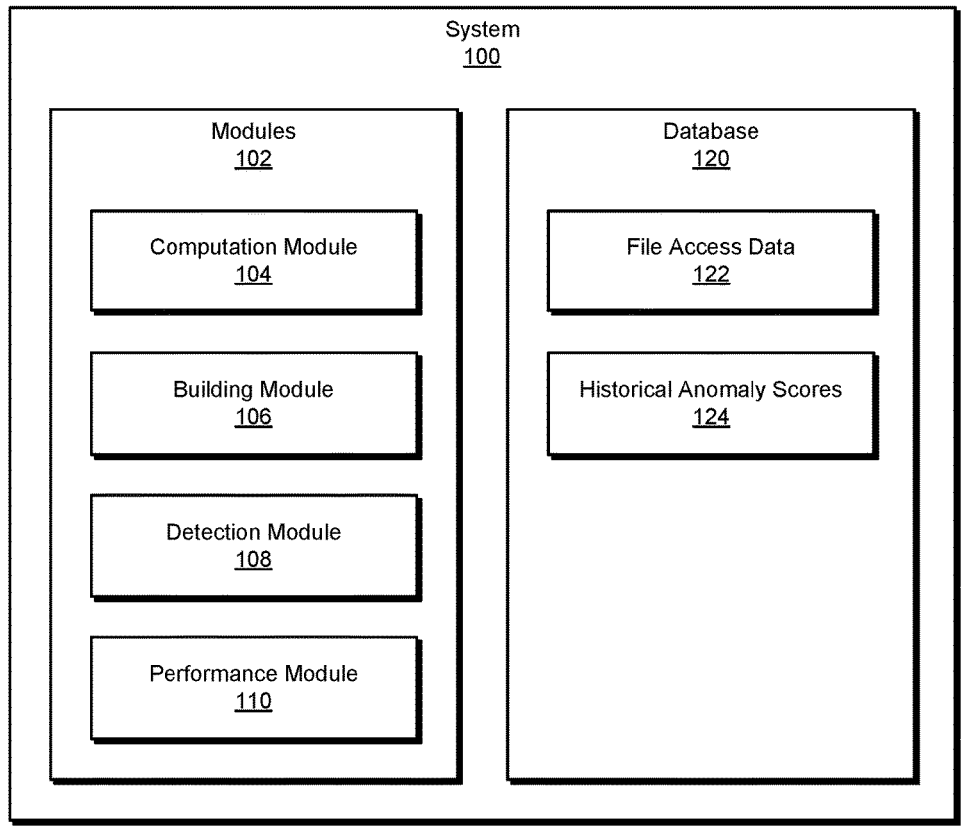
FIG. 1 is a block diagram of an example system for protecting computing resources.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting computing resources. As will be explained in greater detail below, the disclosed systems and methods may detect malicious insider behavior by measuring deviations along two separate axes: deviations from behavior by social network neighbors and deviations from historical behavior by the same user. Notably, the disclosed systems and methods may routinely compute the anomaly score that measures deviations from behavior by social network neighbors and then compare that anomaly score to historical anomaly scores for the same user, thereby computing a kind of second-order or meta-anomaly score (i.e., deviation of one anomaly score from historical anomaly scores, where each anomaly score further measures deviations from behavior by social network neighbors). By measuring deviance along both axes, the disclosed systems and methods may provide a more robust and powerful algorithm for detecting malicious insider behavior. More specifically, the disclosed systems and methods may optionally improve upon other systems by leveraging a specific example or variant of one algorithm, the "ODDBALL" algorithm, in a novel manner to better detect and address malicious insider behavior, as discussed further below.

Figure 2:
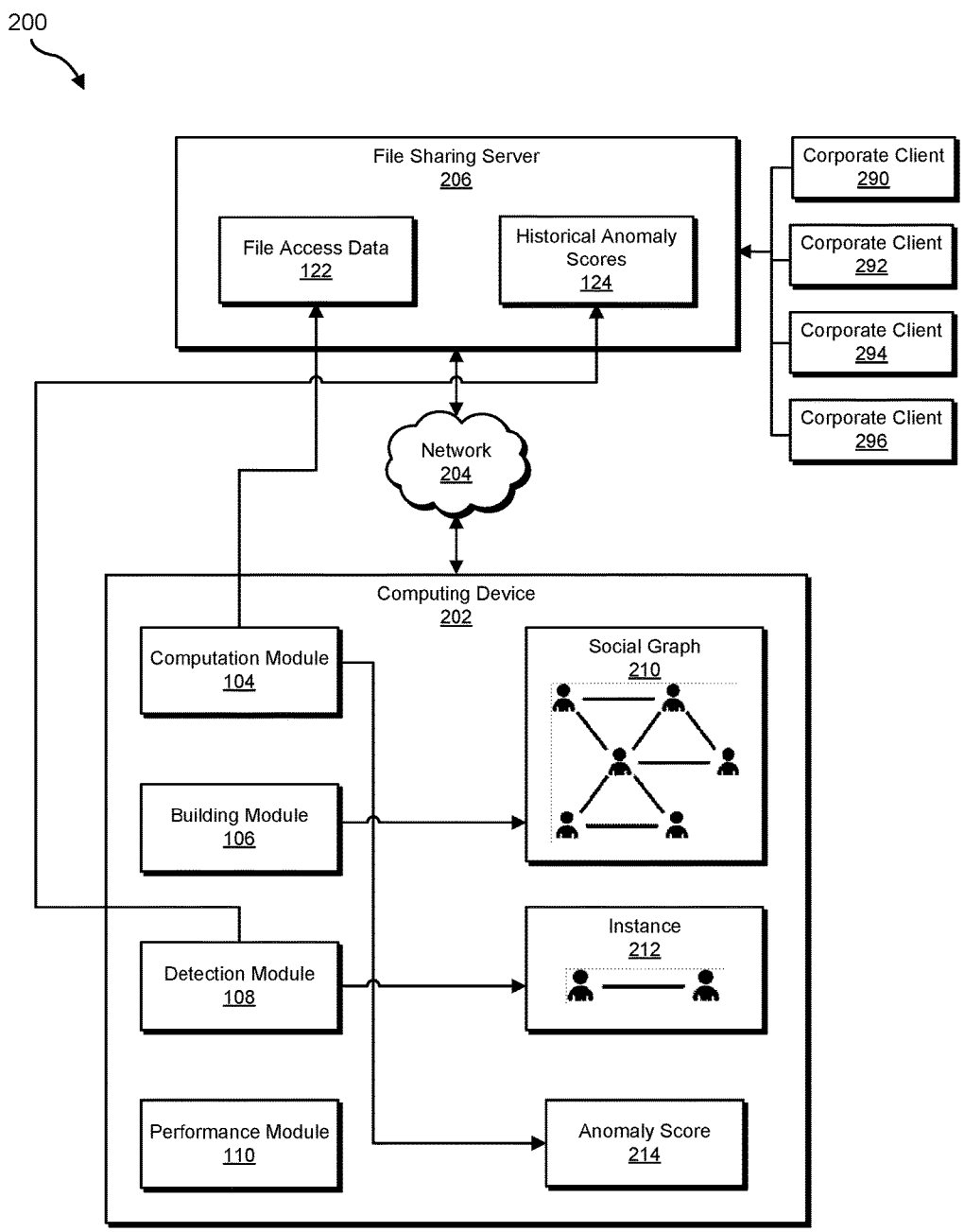
FIG. 2 is a block diagram of an additional example system for protecting computing resources.

The following will provide, with reference to FIGS. 1-2, detailed descriptions of example systems for protecting computing resources. Detailed descriptions of corresponding computer-implemented methods will also be provided in connection with FIGS. 3-6. In addition, detailed descriptions of an example computing system and network architecture capable of implementing one or more of the embodiments described herein will be provided in connection with FIGS. 7 and 8, respectively.

FIG. 1 is a block diagram of example system 100 for protecting computing resources. As illustrated in this figure, example system 100 may include one or more modules 102 for performing one or more tasks. For example, and as will be explained in greater detail below, example system 100 may include a computation module 104 that computes a degree of commonality between pairs of users within a file sharing system based on which files the users accessed over a period of time. Example system 100 may additionally include a building module 106 that builds a social graph that indicates at least one edge between members of an instance of the pairs of users based on the respective degree of commonality for the instance.

Additionally, computation module 104 may further compute an anomaly score for a user within the instance of the pairs of users based on a ratio between a number of neighbors of the user within the social graph and a combined edge weight between nodes within a set including the user and the neighbors of the user. Example system 100 may also include a detection module 108 that detects that the anomaly score deviates, according to a statistical measurement, from historical anomaly scores computed for the same user. Lastly, example system 100 may additionally include a performance module 110 that performs, in response to detecting that the anomaly score deviates from the historical anomaly scores, a protective action to protect computing resources from anomalous behavior by the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or file sharing server 206), computing system 710 in FIG. 7, and/or portions of example network architecture 800 in FIG. 8. One or more of modules 102 in FIG. 1 may also represent all or portions of one or more special-purpose computers configured to perform one or more tasks.

As illustrated in FIG. 1, example system 100 may also include one or more databases, such as database 120. In one example, database 120 may be configured to store file access data 122, which may correspond to any data describing file access behavior by the user, as discussed further below. In one example, file access data 122 may include raw data that specifies usernames, file names, file locations, and/or access times for corresponding file access behavior. Notably, database 120 may also include historical anomaly scores 124, which may correspond to a historical log of computed anomaly scores for one or more users over time. In these examples, one or more of the anomaly scores may be computed in the same, or substantially the same, manner thereby ensuring that a comparison between one score and an average of other historical scores will be meaningful, as described further below.

Database 120 may represent portions of a single database or computing device or a plurality of databases or computing devices. For example, database 120 may represent a portion of file sharing server 206 in FIG. 2, computing system 710 in FIG. 7, and/or portions of example network architecture 800 in FIG. 8. Alternatively, database 120 in FIG. 1 may represent one or more physically separate devices capable of being accessed by a computing device, such as file sharing server 206 in FIG. 2, computing system 710 in FIG. 7, and/or portions of example network architecture 800 in FIG. 8.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a file sharing server 206 via a network 204. In one example, computing device 202 may be programmed with one or more of modules 102 and/or may store all or a portion of the data in database 120. Additionally or alternatively, file sharing server 206 may be programmed with one or more of modules 102 and/or may store all or a portion of the data in database 120.

In one embodiment, one or more of modules 102 from FIG. 1 may, when executed by at least one processor of computing device 202 and/or file sharing server 206, enable computing device 202 and/or file sharing server 206 to protect computing resources. For example, and as will be described in greater detail below, computation module 104 may compute a degree of commonality between pairs of users within a file sharing system, which may correspond to file sharing server 206 and corporate clients 290-296 (i.e., different users or employees within the same corporate enterprise), based on which files the users accessed over a period of time. Building module 106 may build a social graph 210 that indicates at least one edge between members of an instance 212 of the pairs of users based on the respective degree of commonality for instance 212. Computation module 104 may compute an anomaly score 214 for a user within instance 212 of the pairs of users based on a ratio between a number of neighbors of the user within social graph 210 and a combined edge weight between nodes within a set including the user and the neighbors of the user. Detection module 108 may detect that anomaly score 214 deviates, according to a statistical measurement, from historical anomaly scores computed for the same user, which may correspond to historical anomaly scores 124. Performance module 110 may perform, in response to detecting that anomaly score 214 deviates from the historical anomaly scores, a protective action to protect computing resources from anomalous behavior by the user.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, example computing system 710 in FIG. 7, or any other suitable computing device.

File sharing server 206 generally represents any type or form of computing device that is capable of facilitating the sharing of files within a computer network or corresponding organization, such as a corporate enterprise organization. Examples of file sharing server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), example network architecture 800 in FIG. 8, or the like. Network 204 may facilitate communication or data transfer using wireless or wired connections. In one embodiment, network 204 may facilitate communication between computing device 202 and file sharing server 206.

Figure 3:
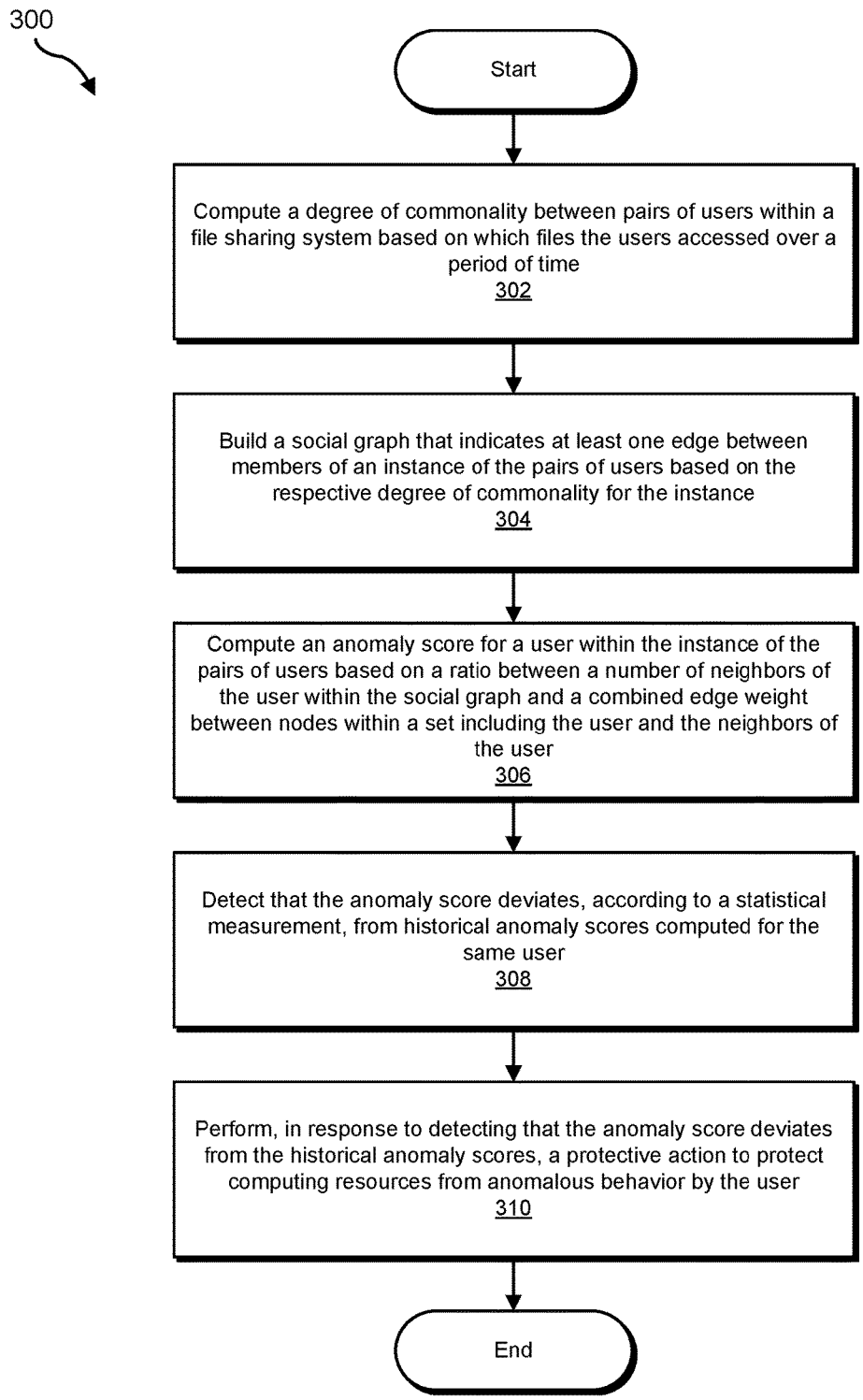
FIG. 3 is a flow diagram of an example method for protecting computing resources.

FIG. 3 is a flow diagram of an example computer-implemented method 300 for protecting computing resources. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of example network architecture 800 in FIG. 8.

As illustrated in FIG. 3, at step 302, one or more of the systems described herein may compute a degree of commonality between pairs of users within a file sharing system based on which files the users accessed over a period of time. For example, computation module 104 may, as part of computing device 202 in FIG. 2, compute a degree of commonality between pairs of users within a file sharing system based on which files the users accessed over a period of time. As used herein, the term "degree of commonality" generally refers to a quantitative or symbolic measurement of an extent to which members of a pair of users access the same files over one or more periods of time. Furthermore, as used herein, the term "file sharing system" is defined broadly as generally referring to any computing system for sharing files. In some examples, the file sharing system may correspond to a file folder synchronization service provided by a third-party vendor on a subscription basis, as discussed further below. In other examples, the file sharing system may correspond to an email system, an instant messaging system, a FILE TRANSFER PROTOCOL system, a web-based document sharing service such as GOOGLE DOCS and/or GOOGLE DRIVE, and/or any other suitable computing system for sharing files.

Computation module 104 may compute the degree of commonality in a variety of ways. For example, the degree of commonality may indicate a percentage, a ratio, a proportion, and/or a measurement along a scale that marks different degrees of commonality (e.g., a proportion of files accessed by one user that were accessed by both users or a proportion of files accessed by either user that were accessed by both users). Computation module 104 may compute the degree of commonality manually or autonomously, upon user request, and/or according to a predefined schedule or security plan. Computation module 104 may store a newly calculated degree of commonality, as well as historical degrees of commonality, within database 120, as outlined above. Notably, computation module 104 may compute the degree of commonality for one, some, all, and/or substantially all pairs of users within a predefined set, including all or substantially all users or employees within a corporation, within a corporate department, and/or within a predefined group.

Similarly, computation module 104 may compute the degree of commonality directly or indirectly. Computation module 104 may compute the degree of commonality directly by measuring specific, explicit, and/or exact file accesses for one or more users (e.g., based on file access raw data). Additionally, or alternatively, computation module 104 may compute the degree of commonality indirectly by measuring accesses to directories, memory pages, data, drives, specific content and/or file portions or excerpts.

Notably, in measuring the degree of commonality, computation module 104 may reference file access log data recorded by file sharing server 206. For example, computation module 104 may query, poll, reference and/or request the file access log data from file sharing server 206 over network 204, as depicted in FIG. 2.

In one embodiment, the file sharing system, which may correspond to file sharing server 206, is used by a corporate enterprise organization. Additionally, the user may constitute or correspond to an employee of the corporate enterprise organization. Furthermore, the protective action may be directed to protect computing resources belonging to the corporate enterprise organization from anomalous behavior by the user, as discussed further below in connection with step 310 of method 300 shown in FIG. 3. In one embodiment, the file sharing system is provided by a third party vendor to the corporate enterprise organization on a subscription basis. For example, the file sharing system may correspond to DROPBOX or BOX corporate file sharing services.

At step 304, one or more of the systems described herein may build a social graph that indicates at least one edge between members of an instance of the pairs of users based on the respective degree of commonality for the instance. For example, building module 106 may, as part of computing device 202 in FIG. 2, build social graph 210 that indicates at least one edge between members of instance 212 of the pairs of users based on the respective degree of commonality for instance 212.

As used herein, the term "social graph" generally refers to any data or data structure that defines or indicates a mathematical graph that maps relationships, and more specifically file access commonality relationships, between different users within the same file sharing system environment. Additionally, the term "social graph," as used herein, depicts users, persons, or employees as nodes within the social graph and, similarly, indicates the relationship as an edge that connects the nodes. Furthermore, in some embodiments, the edges may be weighted such that the weight of the edges indicates or corresponds to the degree of commonality discussed above with respect to step 302 of method 300. For example, in one illustrative embodiment, the social graph may be stored as a list of triples, which each includes a specification of one user, a specification of another user, and a specification of a weight of the edge between the two users.

Figure 4:
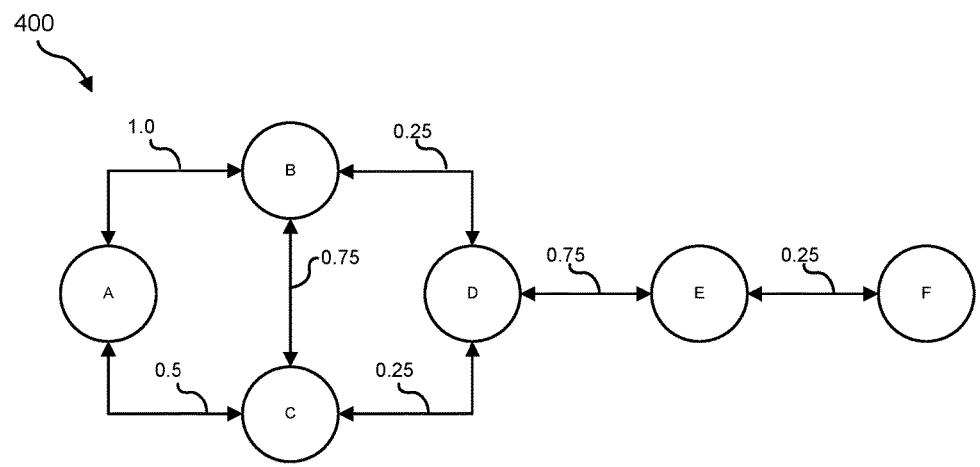
FIG. 4 is a block diagram of example social graphs referenced by the systems and methods for protecting computing resources described herein.
Figure 4:
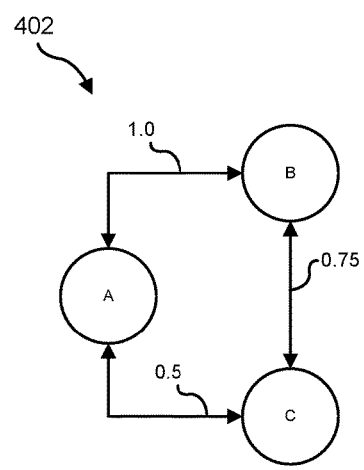
Figure 5:
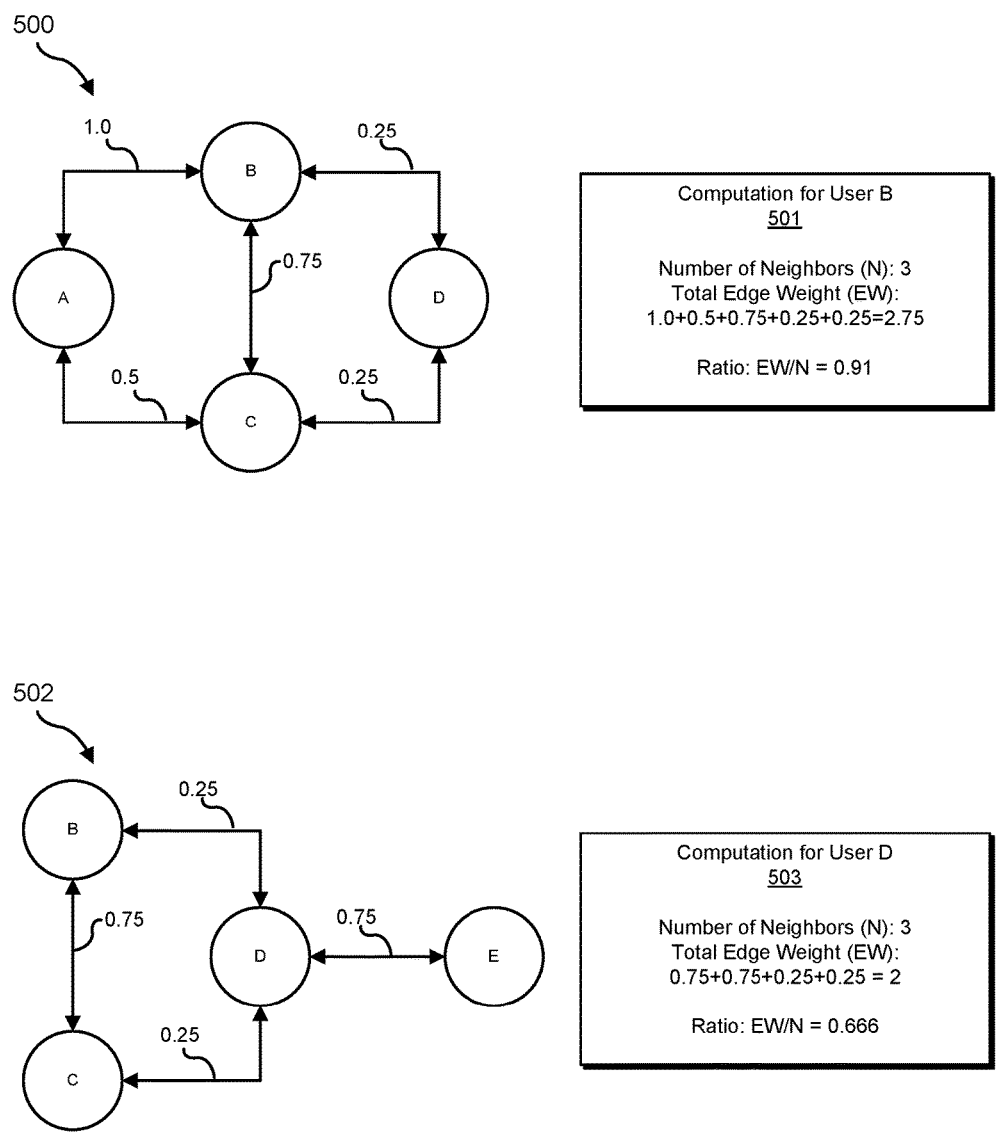
FIG. 5 is a block diagram of further example social graphs referenced by the systems and methods for protecting computing resources described herein.

Building module 106 may build the social graph in a variety of ways. FIG. 4 shows an example social graph 400 that includes six separate users, user A, user B, user C, user D, user E and user F. Additionally, FIG. 4 further illustrates how, within social graph 400, seven pairs of these users are connected by edges that indicate corresponding degrees of commonality in terms of file access behavior over the period of time. FIG. 4 further specifies the values of the weights of these seven edges between user A and user B (edge weight value of 1.0), between user A and user C (edge weight value of 0.5), between user B and user C (edge weight value of 0.75), between user B and user D (edge weight value of 0.25), between user C and user D (edge weight value of 0.25), between user D and user E (edge weight value of 0.75), and between user E and user F (edge weight value of 0.25).

In general, building module 106 may build the social graph by referencing the degree of commonality computed by computation module 104 for each pair within a set of pairs of users. The set of pairs of users may correspond to some, all, and/or substantially all employees within a corporate enterprise, corporate department, predefined group, and/or file sharing environment, as further discussed above.

In some examples, building module 106 may build the social graph by determining whether the respective degree of commonality for the instance satisfies a threshold degree of commonality. Building module 106 may then insert a corresponding edge into the social graph based on determining that the respective degree of commonality for the instance satisfies the threshold degree of commonality.

More specifically, after referencing or retrieving the computed degrees of commonality, building module 106 may determine whether each degree of commonality satisfies a predetermined threshold. For example, if each degree of commonality is measured along a scale from 0 to 1, then an example threshold may be the value of 0.20. In the more specific example of social graph 400, each edge within the social graph shows a weight value that is greater than the threshold of 0.20. For example, the value of the weight of the edge between user A and user B is 1.0, which is greater than the threshold of 0.20. Similarly, the value of the weight of the edge between user A and user C is 0.5, which is greater than the threshold of 0.20.

Although not further shown in social graph 400, other pairs of users may also have computed degrees of commonality which are not depicted as edges within social graph 400, because the resulting degrees of commonality were lower than the threshold of 0.20. For example, computation module 104 may have computed a degree of commonality between user A and user D of 0.1, which is less than the threshold of 0.20, and, therefore, not depicted within social graph 400. Notably, although this example uses the illustrative threshold of 0.20, the threshold may be arbitrarily selected by a user, administrator, and/or system 100 in any manner that serves the intended functionality of method 300 and achieves the improvements in protecting computing resources described herein.

At step 306, one or more of the systems described herein may compute an anomaly score for a user within the instance of the pairs of users based on a ratio between a number of neighbors of the user within the social graph and a combined edge weight between nodes within a set including the user and the neighbors of the user. For example, computation module 104 may, as part of computing device 202 in FIG. 2, compute anomaly score 214 for a user within instance 212 of the pairs of users based on a ratio between a number of neighbors of the user within social graph 210 and a combined edge weight between nodes within a set including the user and the neighbors of the user.

As used herein, the term "anomaly score" generally refers to any score that indicates a quantitative or symbolic measurement of the degree to which a measurement of the user's behavior deviates from corresponding measurements of behavior of other users within the social graph, as discussed further below. Similarly, the term "neighbor" generally refers to users within the social graph that are connected directly by one edge, thereby forming one-hop connections. Notably, this application also contemplates embodiments in which the term "neighbor" may additionally or alternatively refer to users indirectly connected by two-hop, three-hop, or N-hop connections. Furthermore, as used herein, the term "combined edge weight" generally refers to a value computed based on underlying edge weight values within the set including the user and the neighbors of the user, such that the underlying edge weight values serve as inputs or factors into the calculation of the combined edge weight. In one example embodiment, computation module 104 computes the combined edge weight by simply taking the average of every edge weight within the set of users formed by the user and every neighbor of the user, as discussed further below.

Computation module 104 may compute the anomaly score in a variety of ways. Returning to the example of FIG. 4, this figure further shows a sub-graph 402 of social graph 400 that corresponds to user A and the neighbors of user A, as further defined above. In this specific example, the neighbors of user A are user B and user C. Accordingly, sub-graph 402 includes the nodes for user A, user B, and user C, as well as the edges between these nodes, as originally shown within social graph 400, including both the edges that connect to user A and the edges that do not connect to user A (i.e., specifically the edge between user B and user C).

FIG. 4 further shows a computation for user A 403, which outlines how computation module 104 may compute the anomaly score. First, computation module 104 determines or ascertains the number of neighbors for the user under evaluation (i.e., user A in this example). As further shown in this figure, computation for user A 403 indicates that user A has "2" neighbors. Additionally, computation module 104 calculates the total edge weight for sub-graph 402. In some examples, computation module 104 may calculate the total edge weight by simply adding the value of the weight of each edge within sub-graph 402. As further shown in this figure, this addition calculation turns out the following way for this example: 1.0+0.5+0.75=2.25. Furthermore, computation module 104 may compute a ratio between the number of neighbors and the combined or total edge weight. In this specific example, computation module 104 may divide the total edge weight by the number of neighbors and thereby determine the resulting value of 1.125, which corresponds to the anomaly score for user A. In general, computation for user A 403 may correspond to one or more examples or variants of the "ODDBALL" algorithm, which is further described in the article "OddBall: Spotting Anomalies in Weighted Graphs," by Akoglu et al. which is available at http://www3.cs.stonybrook.edu/~leman/pubs/OddBall-_cameraready.pdf (last accessed 22 Jun. 2016) and is incorporated by reference herein in its entirety.

In general, the set including the user and the neighbors of the user includes the user and every neighbor of the user. For example, sub-graph 402 includes user A and every one-hop neighbor of user A. In alternative embodiments, the set may include more users than, or fewer users than, every neighbor of the user under evaluation, depending on the variant of the anomaly score algorithm being used.

In one embodiment, the combined edge weight between nodes within the set is computed by adding an edge weight for every edge between any two members of the set. Returning to the example of sub-graph 402, computation for user A 403 computes the total edge weight (which may correspond to the combined edge weight) by adding the value for each edge shown within sub-graph 402.

In further examples, computation module 104 may compute the anomaly score for the user as part of a batch process that iterates through each of multiple users to scan for anomalous behavior. In additional or alternative embodiments, computation module 104 may compute two or more anomaly scores in parallel. In general, computation module 104 may compute the anomaly score for not just one user, but for an entire multitude of users, because system 100 may not have previous knowledge of which users are engaging in malicious insider behavior. Accordingly, computation module 104 may routinely or comprehensively scan and monitor for malicious insider behavior at least in part by routinely, or according to a predefined schedule, computing the anomaly score for each user within a multitude of users in accordance with method 300.

In the example of social graph 400, computation module 104 may compute the anomaly score for one, some, all, substantially all, or any other permutation of the six users depicted within social graph 400. For example, FIG. 4 further shows sub-graph 402 and the corresponding computation for user A 403, as discussed above at length. Similarly, FIG. 5 further shows a sub-graph 500 for user B and a corresponding computation for user B 501. Furthermore, FIG. 5 also shows a sub-graph 502 for user D and a corresponding computation for user D 503. Notably, the computations for user B and user D parallel computation for user A 403 described above in connection with FIG. 4. In other words, these sub-graphs and corresponding computations illustrate the determination of the number of neighbors for each respective user and the total edge weight for the corresponding sub-graph including each respective user and every one-hop neighbor of the respective user. Similarly, these figures further illustrate how computation module 104 computes the ratio for each respective user by dividing the respective total edge weight by the respective number of neighbors, thereby resulting in the anomaly score for that user.

At step 308, one or more of the systems described herein may detect that the anomaly score deviates, according to a statistical measurement, from historical anomaly scores computed for the same user. For example, detection module 108 may, as part of computing device 202 in FIG. 2, detect that anomaly score 214 deviates, according to a statistical measurement, from historical anomaly scores computed for the same user.

Detection module 108 may detect that the anomaly score deviates from historical anomaly scores in a variety of ways. In some examples, computation module 104 may compute that the anomaly score deviates, according to the statistical measurement, from historical anomaly scores computed for the same user by computing a difference value between the anomaly score and a value based on an average of the historical anomaly scores. Additionally, detection module 108 may then determine that the difference value satisfies a threshold designated as indicating significant statistical deviation.

Figure 6:
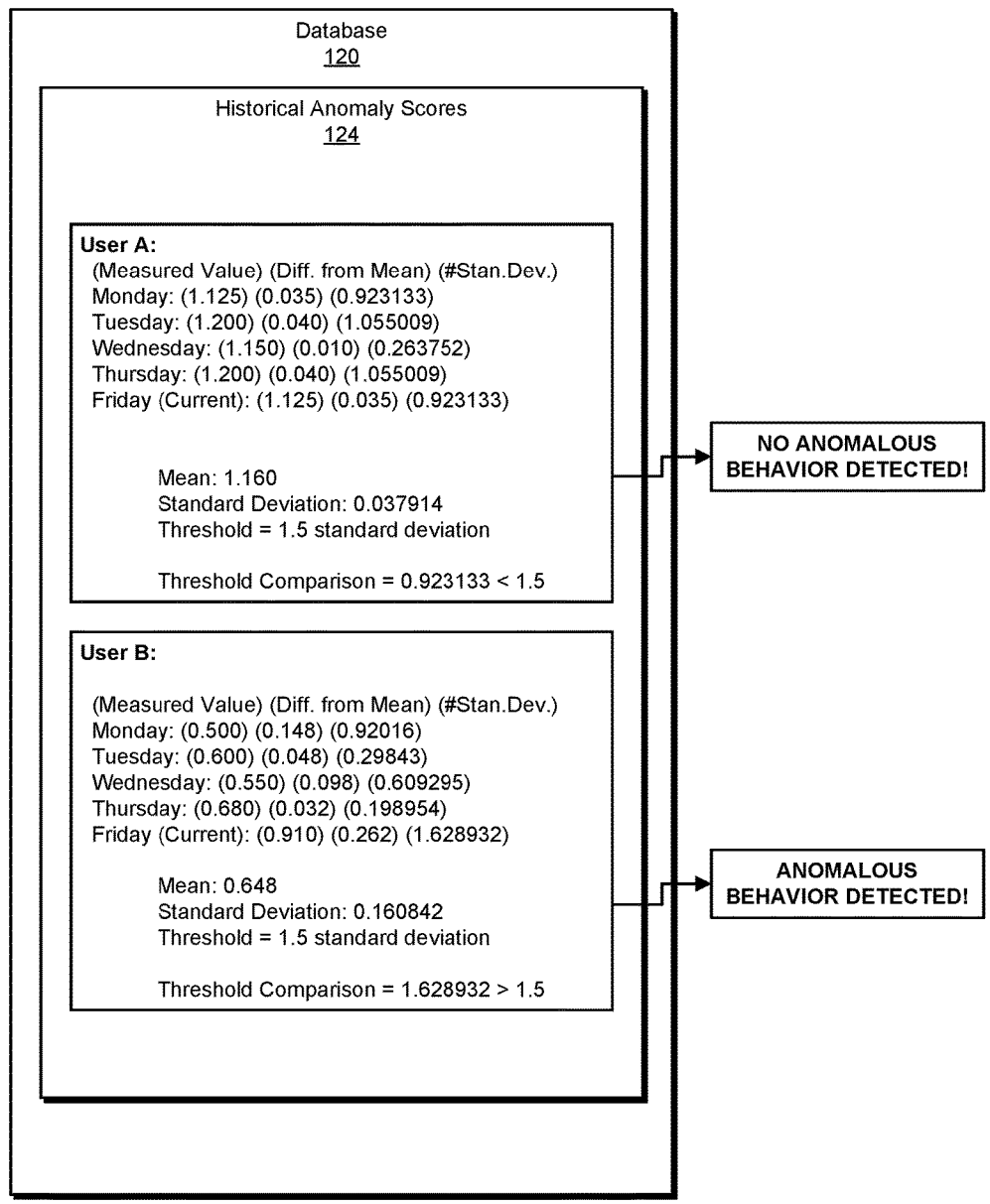
FIG. 6 is a block diagram of an example database that further illustrates how to perform one or more of the computations described herein.

To further illustrate how detection module 108 performs step 308 of method 300, FIG. 6 illustrates an example of historical anomaly scores 124 within database 120 and the corresponding computations that result in detection of statistically significant deviation, as discussed further below. First, FIG. 6 illustrates that system 100 has recorded computed anomaly scores for user A and user B for the past four days, Monday, Tuesday, Wednesday, and Thursday. Additionally, FIG. 6 further illustrates that system 100 has also recorded current anomaly scores (i.e., in the example where Friday is the current day) for both user A and user B, which correspond to the resulting anomaly scores computed within computation for user A 403 depicted within FIG. 4 and computation for user B 501 depicted within FIG. 5 (i.e., the ratio or anomaly score 1.125 for user A shown within computation for user A 403 and the ratio or anomaly score 0.91 for user B shown within computation for user B 501).

Next, FIG. 6 further illustrates that the mean and standard deviation have been calculated for both user A and user B. In this example, the sample standard deviation (as opposed to the population standard deviation, which is another option) has been calculated on the five measurements, including the Friday values. In additional, or alternative, embodiments, the current value (e.g., Friday in FIG. 6) may be omitted from the mean and standard deviation calculations and the previous day's calculations (e.g., the mean and standard deviation for the Monday-Thursday values) may be used for comparing against the current value, or any other sample set of previously recorded values may be used.

Additionally, FIG. 6 also shows, next to each measured value in parentheses, two additional values in parentheses. The first next value, "Diff. from Mean," indicates the absolute value of the difference between the measured value and the mean. The second next value, "#Stan.Dev.," indicates the number of standard deviations that the measured value is from the mean (i.e., #Stan.Dev.=Diff. from Mean/Standard Deviation). For example, for user A on Monday, the measured value was 1.125, which is 0.035 absolute distance from the mean, and this difference corresponds to 0.923133 of the standard deviation, because 0.035 (i.e., the difference) is slightly smaller than 0.037914 (i.e., the standard deviation). The other rows are calculated in a parallel manner while keeping the mean and standard deviation values fixed for each row per user.

Next, FIG. 6 also illustrates that detection module 108 uses a threshold value of 1.5 standard deviations for determining whether the calculated #Stan.Dev. value for each user achieves a level of statistical significance. Although this example uses the value of 1.5 standard deviations, a user, administrator, and/or system module may use any arbitrary value that achieves the intended functionality of method 300 and the associated improvements in protecting computing resources, as further discussed above. For example, the user or other entity may use a relative threshold value that is different for one user than another user (e.g., as in FIG. 6). The user or other entity may use a threshold value that is defined in terms of 1, 2, 3, or any decimal value N multiplied by the mean, the standard deviation, and/or any other statistical value (according to any suitable algebraic or business logic). Additionally, or alternatively, the user or other entity may use a threshold value that is an absolute or non-relative constant value, which may not be defined further in terms of another value. In this example, the #Stan.Dev. value for user A on Friday, 0.923133, is less than the threshold value of 1.5 standard deviations and, therefore, detection module 108 indicates that no anomalous behavior has been detected. In contrast, the #Stan.Dev. value for user B on Friday is 1.628932, which is greater than the threshold value of 1.5 standard deviations and, therefore, detection module 108 indicates that anomalous behavior has been detected for user B.

The equivalent statistical comparison for user A may be performed by determining whether either 1.125 is greater than 1.160+0.037914 or 1.125 is less than 1.160−0.037914 (e.g., whether the measured value falls outside of the mean+/the standard deviation). In this case, the measured value for user A on Friday falls within that window, thereby indicating that no anomalous behavior has been detected. More generally, the #Stan.Dev. calculation may serve as a species of any measurement of a degree of statistical deviation or anomalous behavior, which may correspond to a security score or second-order anomaly score (e.g., a second-order anomaly score that is based on the original anomaly score in the measured value left column in FIG. 6).

Notably, because the anomaly score is based on a ratio between two values, the number of neighbors and the combined edge weight, any significant change in one of these values, without a corresponding or proportional change in the other of these values, may trigger detection of anomalous behavior, as outlined above. Furthermore, as first discussed above, the example of FIG. 6 shows how the disclosed systems and methods measure behavioral deviance on two separate axes, thereby providing more accurate and comprehensive detection of malicious insider behavior. Specifically, the disclosed systems and methods target the detection of second-order deviant behavior or meta-deviant behavior by, for example, tolerating or passing behavior by a user that deviates from average behavior by the user's neighbors when the user has always deviated in that manner. In contrast, regardless of whether a user has always acted similar or dissimilar to the user's social graph neighbors, detection module 108 may detect any significant change in that relative level of behavioral deviance as triggering detection of anomalous behavior, as outlined above.

Furthermore, in some examples, detection module 108 may use an indication of the user's recent or expected termination or departure from the company as a factor in determining whether to indicate that anomalous user behavior has been detected. More specifically, in some examples, the fact that the user recently departed the company, according to some predetermined measurement (i.e., within a predefined window of time), may serve as a factor in the anomalous behavior detection calculation and, in some cases, may be outcome determinative.

At step 310, one or more of the systems described herein may perform, in response to detecting that the anomaly score deviates from the historical anomaly scores, a protective action to protect computing resources from anomalous behavior by the user. For example, performance module 110 may, as part of computing device 202 in FIG. 2, perform, in response to detecting that anomaly score 214 deviates from the historical anomaly scores, a protective action to protect computing resources from anomalous behavior by the user. As used herein, the term "protective action" generally refers to any action that a computerized security system may take to protect computing resources in response to detection of anomalous user behavior regarding file access patterns. In one embodiment, the protective action may include alerting an administrator to the detecting that the anomaly score deviates from the historical anomaly scores. In some examples, performance module 110 may perform the protective action in proportion to a general or specific measurement of statistical deviation or anomalous behavior (e.g., the original anomaly score on the left column of FIG. 6 and/or the #Stan.Dev., as outlined above), such as by setting a value, degree, length of distance, and/or length of time of a security setting (and/or a number, amount, or proportion of security settings, precautions, and/or mechanisms) in proportion to the degree of the general or specific measurement of statistical deviation or anomalous behavior.

In another embodiment, the protective action scans raw data logs to identify specific files accessed by the user that correspond to the anomalous behavior. More generally, the protective action may include any one or more of the following: alerting or confronting the user, eliminating or diminishing access by the user to one or more of the computing resources, alerting the user's supervisor, alerting the police, regulatory, and/or other government authority, sounding an alarm, modifying, triggering, and/or heightening building or room locks or security settings, triggering one or more disciplinary actions by human resources or corporate management, heightening one or more security settings, freezing, quarantining, and/or securing one or more computing resources, and/or eliminating or diminishing the ability of the user to store, transmit, share, leak, and/or exfiltrate one or more computing resources, files, items of data, corporate secrets, items of intellectual property, and/or any other protected asset.

The above discussion in connection with FIG. 3 provides a general overview of the disclosed systems and methods. Additionally, the following discussion provides a simpler and more concrete description of one embodiment. The disclosed systems and methods may analyze the file access patterns of the users/employees on file sharing systems, such as BOX or a corporate file share. From this, the disclosed systems and methods may calculate the degree of commonality between every pair of users. The degree of commonality may be based on which files users have accessed during a given time period (e.g., a day). The disclosed systems and methods may build a social graph for that day. The disclosed systems and methods may then compute an anomaly score for a user based on the ratio of the user's number of neighbors and the weighted edge scores between them. The anomaly score for each user may be compared with historic values for the same user. The disclosed systems and methods may flag a user's behavior for that day as anomalous if the behavior deviates significantly from the user's average past behavior. After a flag is raised, the disclosed systems and methods, and/or a human user or administrator, may analyze raw data to identify the file accesses which potentially or actually led to this anomalous behavior. In general, the disclosed systems and methods may improve the functioning and performance of data loss prevention systems and technology.

Figure 7:
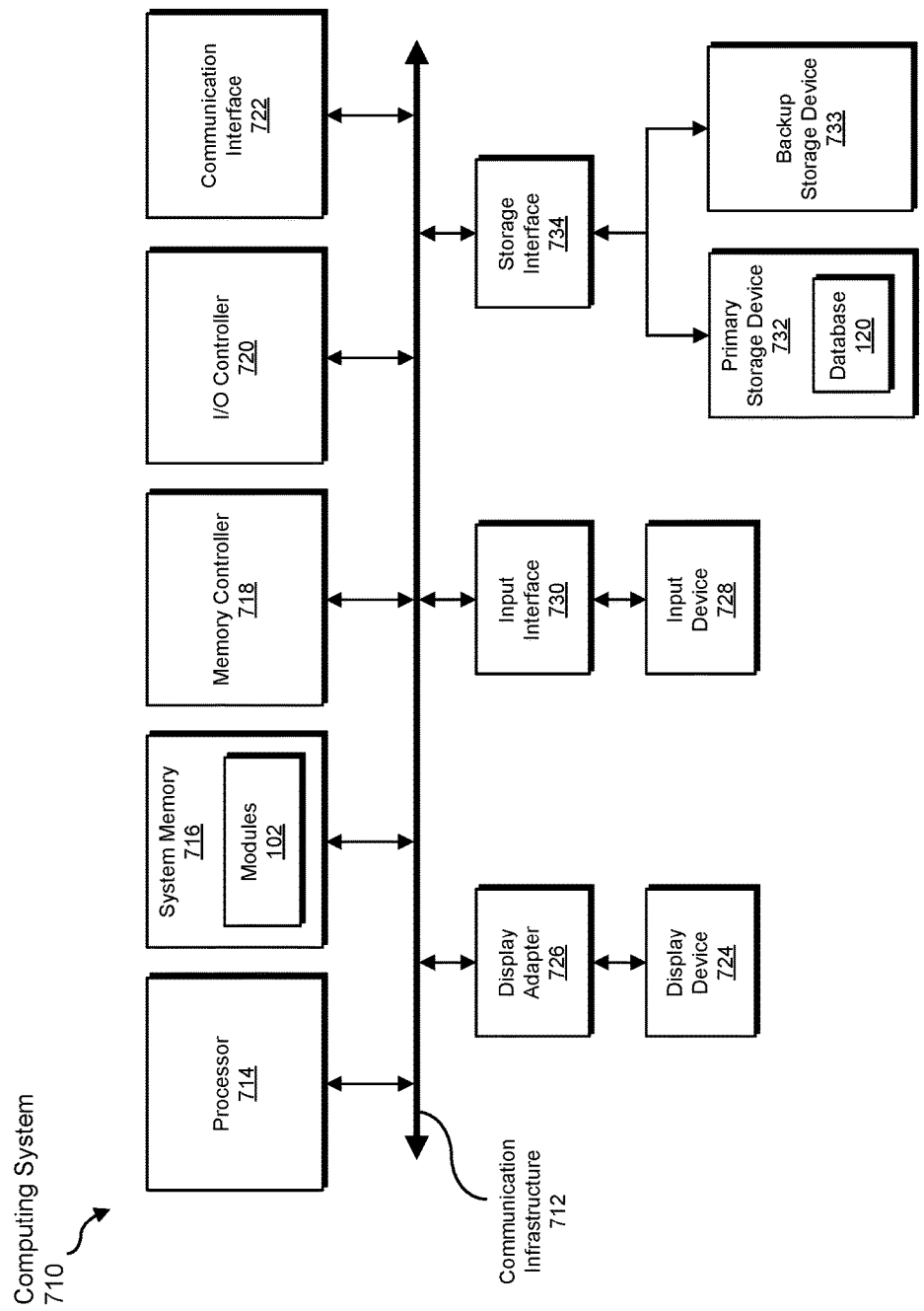
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to communication infrastructure 712 via an input interface 730. Input device 728 generally represents any type or form of input device capable of providing input, either computer or human generated, to example computing system 710. Examples of input device 728 include, without limitation, a keyboard, a pointing device, a speech recognition device, or any other input device.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
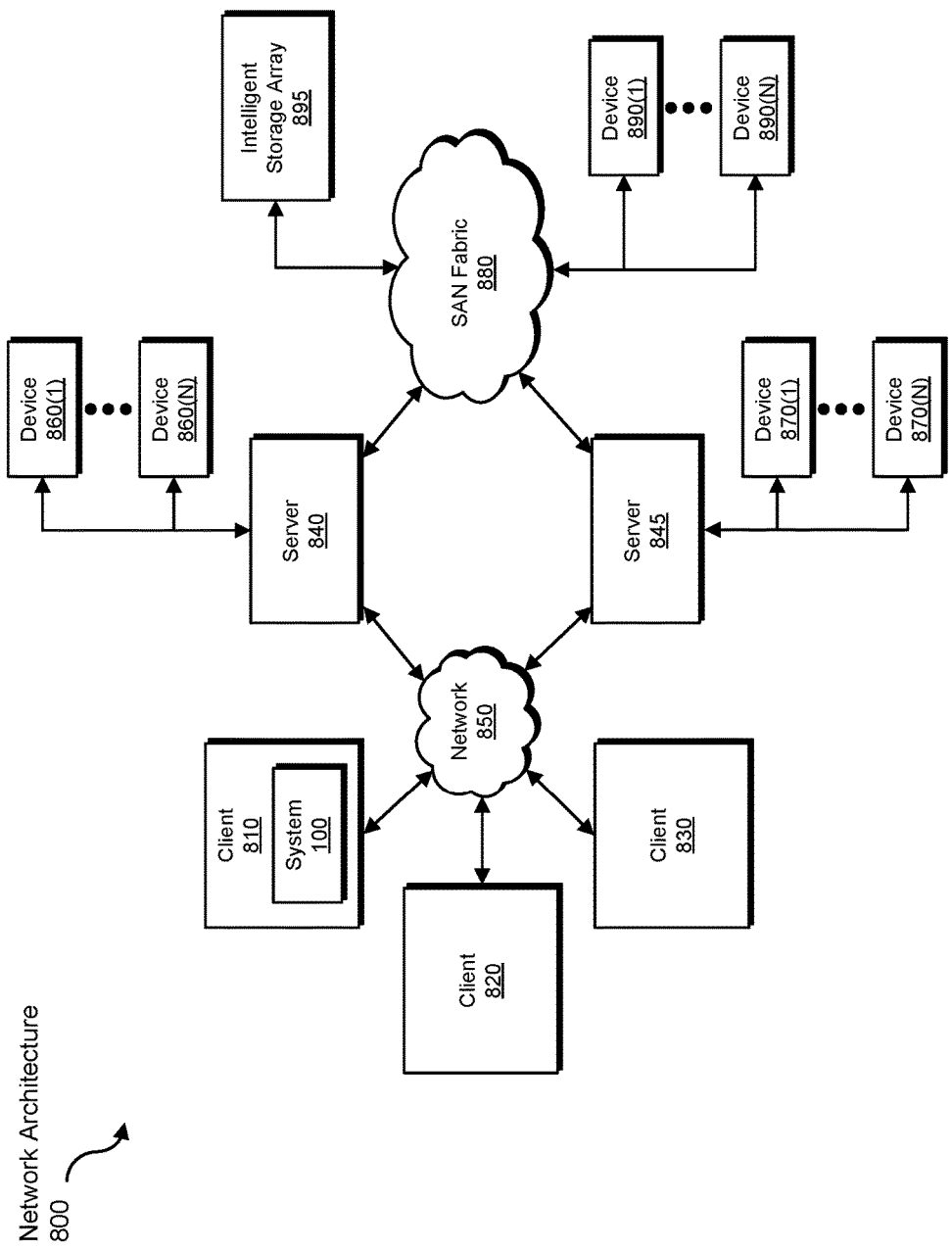
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for protecting computing resources.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting computing resources, at least a portion of the method being performed by a computing device comprising at least one processor, the method comprising:
   computing a respective degree of commonality for pairs of users within a file sharing system based on which files the users accessed over a period of time;
   building a social graph that indicates at least one edge between members of an instance of the pairs of users based on the respective degree of commonality for the instance;
   computing an anomaly score for a user within the instance of the pairs of users based on a ratio between a number of neighbors of the user within the social graph and a combined edge weight between nodes within a set including the user and the neighbors of the user;
   detecting that the anomaly score deviates, according to a statistical measurement, from historical anomaly scores computed for the same user; and
   performing, in response to detecting that the anomaly score deviates from the historical anomaly scores, a protective action to protect computing resources from anomalous behavior by the user.

2. The computer-implemented method of claim 1, wherein building the social graph comprises:
   determining whether the respective degree of commonality for the instance satisfies a threshold degree of commonality; and
   inserting a corresponding edge into the social graph based on determining that the respective degree of commonality for the instance satisfies the threshold degree of commonality.

3. The computer-implemented method of claim 1, wherein the set including the user and the neighbors of the user includes the user and every neighbor of the user.

4. The computer-implemented method of claim 3, wherein the combined edge weight between nodes within the set is computed by adding an edge weight for every edge between any two members of the set.

5. The computer-implemented method of claim 1, wherein detecting that the anomaly score deviates, according to the statistical measurement, from historical anomaly scores computed for the same user comprises:
  computing a difference value between the anomaly score and a value based on an average of the historical anomaly scores; and
  determining that the difference value satisfies a threshold designated as indicating significant statistical deviation.

6. The computer-implemented method of claim 1, wherein the protective action comprises alerting an administrator to the detecting that the anomaly score deviates from the historical anomaly scores.

7. The computer-implemented method of claim 1, wherein:
  the file sharing system is used by a corporate enterprise organization;
  the user is an employee of the corporate enterprise organization; and
  the protective action is directed to protecting computing resources belonging to the corporate enterprise organization from the anomalous behavior by the user.

8. The computer-implemented method of claim 7, wherein the file sharing system is provided by a third party vendor to the corporate enterprise organization on a subscription basis.

9. The computer-implemented method of claim 1, wherein computing the anomaly score for the user is performed as part of a batch process that iterates through each of multiple users to scan for anomalous behavior.

10. The computer-implemented method of claim 1, wherein the protective action scans raw data logs to identify specific files accessed by the user that correspond to the anomalous behavior.

11. A system for protecting computing resources, the system comprising:
  a computation module, stored in memory, that computes a respective degree of commonality for pairs of users within a file sharing system based on which files the users accessed over a period of time;
  a building module, stored in memory, that builds a social graph that indicates at least one edge between members of an instance of the pairs of users based on the respective degree of commonality for the instance;
  wherein the computation module further computes an anomaly score for a user within the instance of the pairs of users based on a ratio between a number of neighbors of the user within the social graph and a combined edge weight between nodes within a set including the user and the neighbors of the user;
  a detection module, stored in memory, that detects that the anomaly score deviates, according to a statistical measurement, from historical anomaly scores computed for the same user;
  a performance module, stored in memory, that performs, in response to detecting that the anomaly score deviates from the historical anomaly scores, a protective action to protect computing resources from anomalous behavior by the user; and
  at least one physical processor configured to execute the computation module, the building module, the detection module, and the performance module.

12. The system of claim 11, wherein the building module builds the social graph at least in part by:
  determining whether the respective degree of commonality for the instance satisfies a threshold degree of commonality; and
  inserting a corresponding edge into the social graph based on determining that the respective degree of commonality for the instance satisfies the threshold degree of commonality.

13. The system of claim 11, wherein the set including the user and the neighbors of the user includes the user and every neighbor of the user.

14. The system of claim 13, wherein the computation module computes the combined edge weight between nodes within the set by adding an edge weight for every edge between any two members of the set.

15. The system of claim 11, wherein the detection module detects that the anomaly score deviates, according to the statistical measurement, from historical anomaly scores computed for the same user at least in part by:
  computing a difference value between the anomaly score and a value based on an average of the historical anomaly scores; and
  determining that the difference value satisfies a threshold designated as indicating significant statistical deviation.

16. The system of claim 11, wherein the protective action comprises alerting an administrator to the detecting that the anomaly score deviates from the historical anomaly scores.

17. The system of claim 11, wherein:
  the file sharing system is used by a corporate enterprise organization;
  the user is an employee of the corporate enterprise organization; and
  the protective action is directed to protecting computing resources belonging to the corporate enterprise organization from the anomalous behavior by the user.

18. The system of claim 17, wherein the file sharing system is provided by a third party vendor to the corporate enterprise organization on a subscription basis.

19. The system of claim 11, wherein the computation module computes the anomaly score for the user as part of a batch process that iterates through each of multiple users to scan for anomalous behavior.

20. A non-transitory computer-readable medium comprising one or more computer-readable instructions that, when executed by at least one processor of a computing device, cause the computing device to:
  compute a respective degree of commonality for pairs of users within a file sharing system based on which files the users accessed over a period of time;
  build a social graph that indicates at least one edge between members of an instance of the pairs of users based on the respective degree of commonality for the instance;
  compute an anomaly score for a user within the instance of the pairs of users based on a ratio between a number of neighbors of the user within the social graph and a combined edge weight between nodes within a set including the user and the neighbors of the user;
  detect that the anomaly score deviates, according to a statistical measurement, from historical anomaly scores computed for the same user; and
  perform, in response to detecting that the anomaly score deviates from the historical anomaly scores, a protective action to protect computing resources from anomalous behavior by the user.

* * * * *